Oct. 29, 1946.　　F. L. BENTHALL, SR　　2,410,196
LAWN EDGER
Filed July 7, 1944　　2 Sheets-Sheet 1
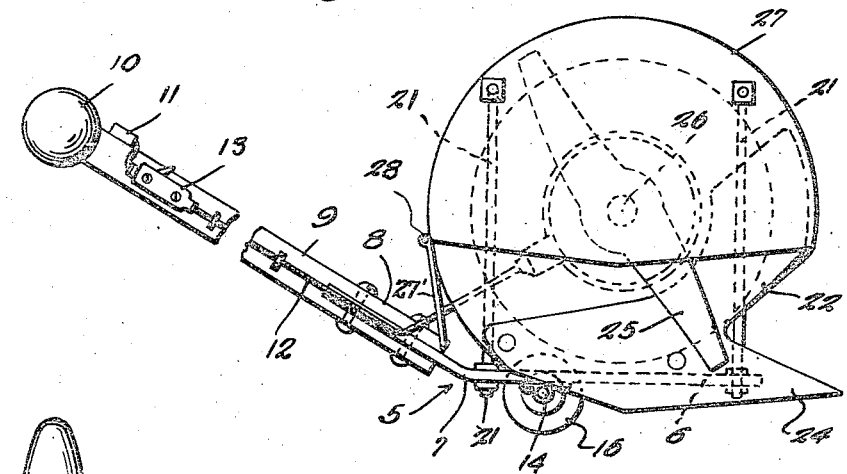
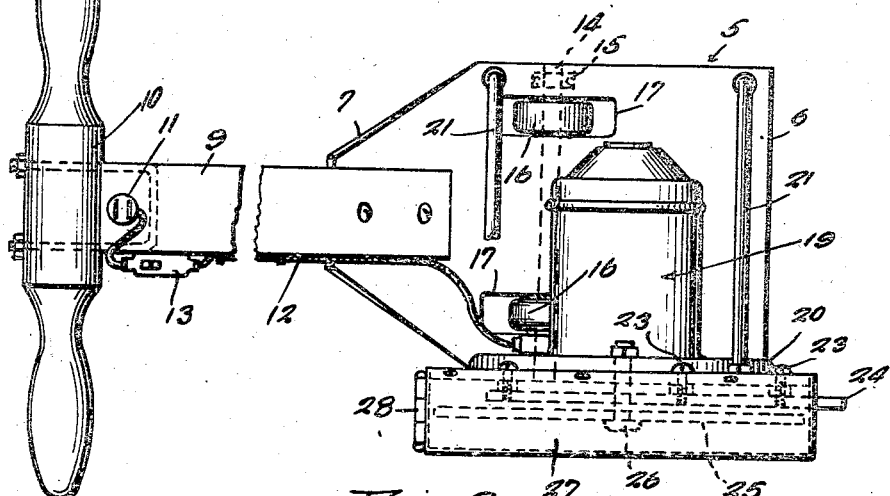
Inventor
Frederick L. Benthall, Sr.
By *Clarence A. O'Brien
and Harvey B. Jackson*
Attorneys Oct. 29, 1946.    F. L. BENTHALL, SR    2,410,196
LAWN EDGER
Filed July 7, 1944    2 Sheets-Sheet 2
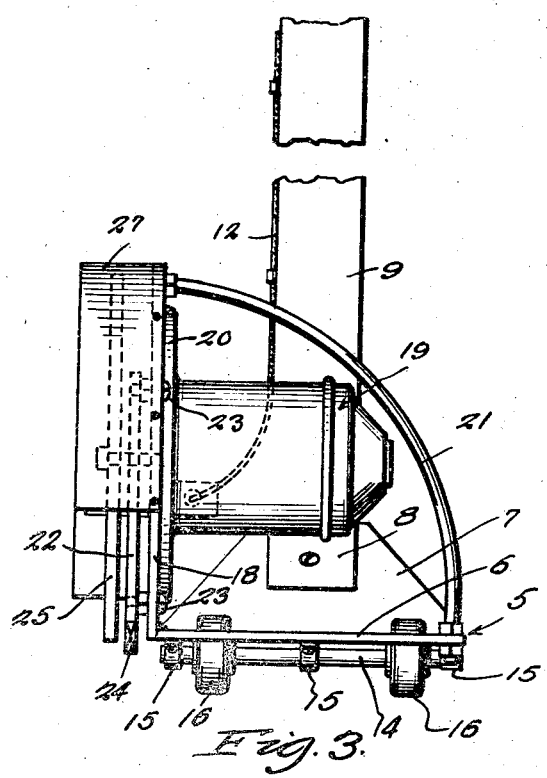
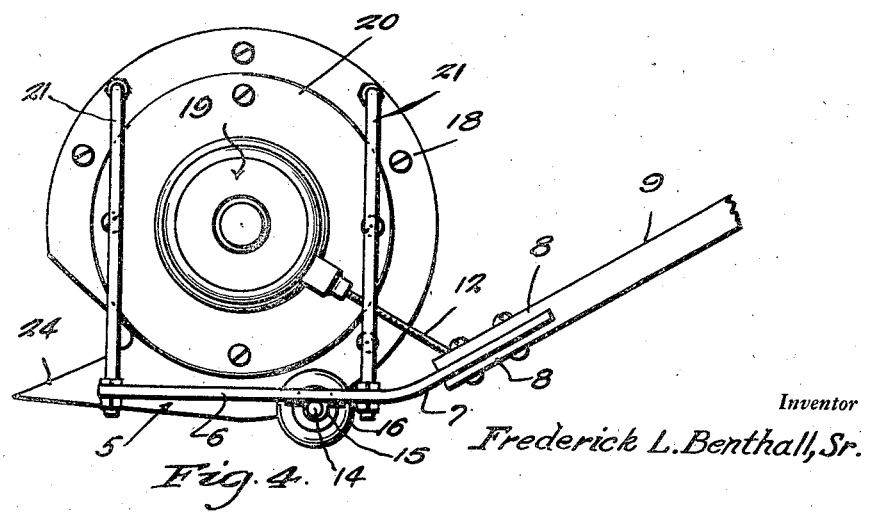
Inventor
Frederick L. Benthall, Sr.

Patented Oct. 29, 1946

2,410,196

UNITED STATES PATENT OFFICE 2,410,196

LAWN EDGER

Frederick L. Benthall, Sr., Houston, Tex.

Application July 7, 1944, Serial No. 543,927

2 Claims. (Cl. 56—256)

This invention relates to a novel and improved lawn edger of an electric motor walking attendant steered and maneuvered type.

More specifically, the invention comprises a low slung wheel-supported truck provided with a suitable push-pull handle and a motor driven trimmer or clipper carried thereby.

One phase of novelty is predicated upon the simple and expedient truck, this characterized by a horizontal base plate tiltably supported on a wheel-equipped axle, whereby to permit the plate to be rocked and shifted advantageously to accommodate the contour of the surface and to concentrate the cutting at the desired point or points.

Novelty is also predicated upon the rockable wheel-supported truck plate, this having a perpendicular adapter plate and the latter constituting a mount for the motor as well as a convenient support for the coacting cutting element and a protective shield or fender arrangement.

Other features and advantages will become more readily apparent from the following description and the accompanying illustrative drawings.

In the drawings, wherein like numerals are employed to designate like parts throughout the same:

Figure 1 is a side elevational view of a lawn edger constructed in accordance with the principles of the present invention.

Figure 2 is a top plan view thereof, with portions broken away.

Figure 3 is a front end elevational view of the same.

Figure 4 is a side elevation observing the structure in a direction from right to left in Figure 3.

The truck, as a unit, is denoted by the numeral 5 and comprises a substantially rectangular tiltable base plate 6 having, at its inner end, an upwardly and rearwardly inclined apron 7 straddled by the furcations 8 at the lower end of the handle 9. The handle is of appropriate construction, material and length and is provided at its upper end with a suitable hand-grip 10. While considering the handle it will be noted that it is provided with an appropriate socket 11 to accommodate an extension cord (not shown), the power conducting cable 12 being connected to said socket through the medium of an appropriate and suitably arranged switch 13.

The axle 14 is journaled for rotation in simple hanger and bearing brackets 15 attached to the underside of the plate 6, said axle carrying the ground-engaging and transporting wheels 16. The wheels are relatively small so as to dispose the base plate close to the ground and said plate is provided with slots 17 (see Figure 2) through which the upper half-portions of the wheels protrude and clear. Thus, the truck frame and all parts mounted thereon is permitted to rock on the horizontal axes provided by these bearings and axle arrangement. It is to be noted that the axle is supported toward the rear to provide the desired balance and fulcruming results.

A substantially disk-like adapter plate 18 is secured to and rises from one longitudinal edge of the base plate and this constitutes an effective mount for the electric motor 19, whose base 20 is appropriately secured to the plate, the motor overlying, in spaced relation, the base plate. For stability I provide suitable arcuate stay rods 21, these being connected at their lower ends to the opposite edge of the base and at their upper ends to the upper marginal portion of the adapter plate 18.

Reference being had to Figure 1, it will be seen that a yoke-like plate 22 is movably bolted as at 23 to the outer face, lower marginal portion of the adapter plate. This yoke is fashioned into a substantially V-shaped stationary cutter blade 24 whose upper inclined edge serves to lift and feed and guide the grass into the path of rotation of the coacting rotatable clipper blade 25. The latter is keyed centrally to the motor shaft as at 26 and sweeps through the orbital path indicated to advantage in Figure 1. The adapter plate also carries a suitably proportioned and shaped fender-guard 27 having a flap 27' which is hingedly mounted in place as at 28.

It is yet to be pointed out that the aforementioned power conducting cable 12 is suitably connected to the motor as shown for example in Figures 2 and 4.

It is believed that the mode of operation and general use of the edger is reasonably clear, considering the drawings in conjunction with the description. It is substantially fool-proof and safe and easy to use, is readily maneuverable and aptly fulfills the requirements of the manufacturers, tradesmen and users.

It is to be noted that the self-leveling and balancing truck is low slung but is of sufficient clearance to enhance satisfactory and easy handling of the device. The motor is out-of-the-way and overlies the base plate and is more or less confined between the arcuate braces or stays 21, these serving as guards for said motor. Moreover, since the motor is located slightly in advance of the axle 14 and the handle extends rearwardly at the incline shown in Figure 1, the handle and the motor counter-balance each other and permit the device to be easily rocked about the axle as a fulcrum, thus adding to the factors of maneuverability and dependability and permitting the device to be easily guided while being pushed forwardly.

It is thought that persons skilled in the art to which the invention relates will be able to obtain a clear understanding of the invention after considering the description in connection with the drawings. Therefore, a more lengthy description is regarded as unnecessary.

Minor changes in the shape, size and arrangement of details coming within the field of invention claimed may be resorted to in actual practice, if desired.

I claim:

1. A lawn edger of the class described comprising a horizontally extending handle-equipped wheel-supported truck, a vertical adapter plate extending upwardly at one side of said truck, a motor on said plate extending inwardly therefrom over said truck, a guard on said plate extending outwardly therefrom, a stationary cutter blade on said plate extending horizontally outwardly of the lower portion of the plate and projecting forwardly from the front end of said truck, and a rotary cutter connected with the motor shaft and operating within the confines of said guard in cooperating relation to the stationary blade.

2. A lawn edger of the class described comprising a horizontally extending handle equipped wheel-supported truck, a vertical adapter plate extending upwardly at one side of said truck, a motor on said plate extending inwardly therefrom over said truck, spaced arcuate reinforcing and guard braces overlying said motor connected between said adapter plate and truck, a guard on said plate extending outwardly therefrom, a stationary cutter blade on said plate extending horizontally outwardly of the lower portion of the plate and projecting forwardly from the front end of said truck, and a rotary cutter connected with the motor shaft and operating within the confines of said guard in cooperating relation to the stationary blade.

FREDERICK L. BENTHALL, SR.